United States Patent Office.

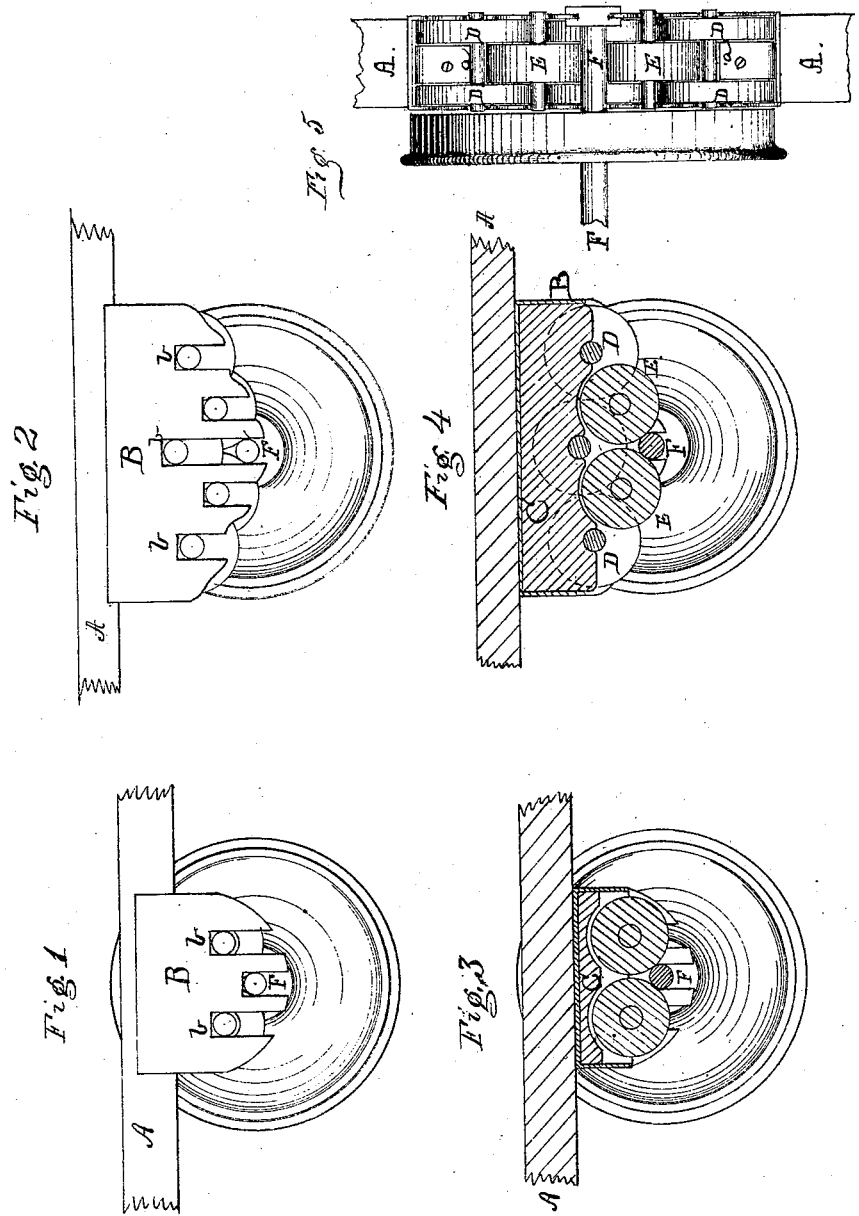

PIERCE W. YARRELL, OF LITTLETON, NORTH CAROLINA.

Letters Patent No. 101,401, dated March 29, 1870.

IMPROVEMENT IN ANTI-FRICTION JOURNALS.

The Schedule referred to in these Letters Patent and making part of the same

*To all whom it may concern:*

Be it known that I, PIERCE W. YARRELL, of Littleton, in the county of Halifax and State of North Carolina, have invented new and useful Improvements in Anti-Friction Journals; and I do hereby declare the following to be a clear and exact description of the nature thereof, sufficient to enable others skilled in the art to which my invention appertains to fully understand and use the same, reference being had to the accompanying drawings making part of this specification, in which—

Figures 1 and 2 are side views of the device illustrating my invention.

Figures 3 and 4, respectively, are central vertical longitudinal sections thereof.

Figure 5 is a view of the under side of fig. 2.

Similar letters of reference indicate corresponding parts in the several figures.

My invention consists in a series of wheels or rollers applied to a journal or axle, so that the friction at the points of bearing thereof is distributed over a larger surface, and thereby almost overcome, or at least greatly lessened.

The employment of boxes for the axle or journal, and the constant lubrication thereof are rendered unnecessary, as will be hereinafter more fully described.

In the drawings—

A may represent a portion of a framing or a section of a car, either adapted to support the hangers B.

Within the hangers B I place boxes C, which are confined in wood or metal frames, and form bearings for the wheels or rollers D.

Each of these wheels or rollers consists of two wheels, united by a common axle, $a$, which rests on its respective box, and the wheels are at the side of said box. These wheels or rollers I will hereafter designate as the double wheels.

In the present case I employ three such double wheels for each hanger, and arrange them, preferably, with the central one higher than the side ones.

E E represent two single wheels, which are located in the spaces formed by the double wheel.

Each wheel occupies a portion of the space of the central wheel and of one of the side wheels.

The axles of the two wheels E rest on the peripheries of the double wheels, that is, each axle rests on the peripheries of the central wheel and one side wheel, and possesses no other bearing or boxes.

F may represent a shaft, axle, or journal, which bears uniformly and simultaneously against the peripheries of the two single wheels E.

If desired, the axles of the double wheels D, and of the single wheels E, may be extended so as to project into or beyond slots $b$, formed in the hangers, in order to be guided thereby; but if said extensions and slots are dispensed with, it will not affect the nature of my invention.

The operation is as follows:

If my invention is applied to shafting, power is communicated to the shaft or axle F in any well-known manner. If the invention is applied to cars, the movement thereof will rotate the axle or journal of the wheels. In either case the axle, shaft, or journal rotates and communicates motion to the single wheels E, and through them to the double wheels D.

In the present case the axle F describes five revolutions to one revolution of the single wheels, and the latter describe five revolutions to one revolution of the double wheel; but this ratio may be increased or diminished, as circumstances may require.

The friction or "slip" of the axle is at first distributed to the peripheries of the single wheels E, and from thence to their axles. The latter distributes the friction or "slip" to the peripheries of the double wheels, and they, in return, to their single axles.

It will be seen that the box or boxes C in the hangers receive the final friction or "slip," and thus said friction or "slip," which commenced at the axle or journal F, is distributed over a large space, and is almost overcome at said point of commencement.

It will be further seen that in the present arrangement no boxes are required for the axle or journal F, or for the axle of the single wheels E. Nor is it necessary to provide any lubricant for said parts. It is necessary that the axles of the double wheels be lubricated, but as said wheels revolve about but once to every twenty-five revolutions of the axle or journal, it is evident that there is a great saving of lubricating material by my invention.

The oil-cups or chambers for the axles of the double wheels, and the proper springs for their boxes, are to be located as will be found most convenient or desirable.

In figures 1 and 3 I have shown the single wheels as mounted on box or boxes similar to the box or boxes C, on which the double wheels D are mounted, with this exception, that each of the latter, having a common axle, requires but a single bearing, while in the former a bearing is necessary for each side of the wheel.

The axle journal or shaft F may be simply designated as the axle F, and it is not designed to limit the invention to any particular application.

The advantages of the invention are apparent. The anti-friction rollers, besides producing the results stated, act as reversed supporters of weight which is first imposed on the axle.

Having thus described my invention,

What I claim as new, and desire to secure by Letters Patent, is—

1. The method of reducing and distributing friction between an axle or journal and its bearings, by means substantially as shown and described and for the purpose set forth.

2. The series of double wheels D, mounted on boxes for receiving and distributing the friction or "slip" of the axle F, through the medium of the boxless wheels E, which are arranged together for joint operation substantially as set forth.

3. The boxless single wheels E, having their axles bearing against the peripheries of the double wheels D, and confined in place by the axle F, whose friction they receive, substantially as and for the purpose described.

4. The arrangement within the hangers B of the box or boxes C, for supporting frictional wheels, substantially as and for the purpose described.

5. The box or boxes C, located within the hangers, the double wheels D mounted thereon, the single wheels E having their axles bearing on the peripheries of the double wheels, and the axle F bearing against the single wheels, when adapted to operate together, substantially as described.

6. The combination of the anti-friction rollers with the shaft or axle, when used as reversed supporters of weight, substantially in the manner and for the purposes shown and described.

To the above I have signed my name this 21st day of February, 1870.

PIERCE W. YARRELL.

Witnesses:
JOHN A. WIEDERSHEIM.
W. H. FINCKEL.